R. C. HOFFMAN.
DISK WHEEL.
APPLICATION FILED AUG. 30, 1919.
1,353,161.
Patented Sept. 21, 1920.
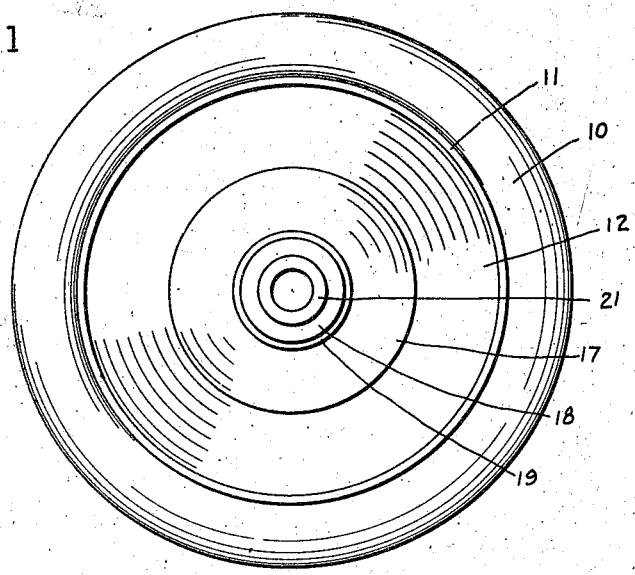
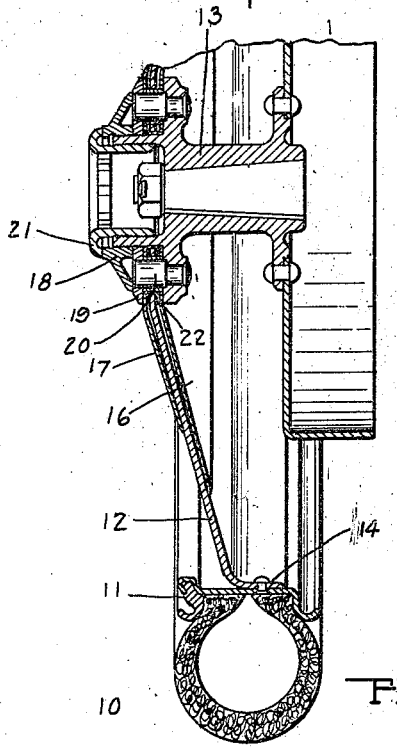
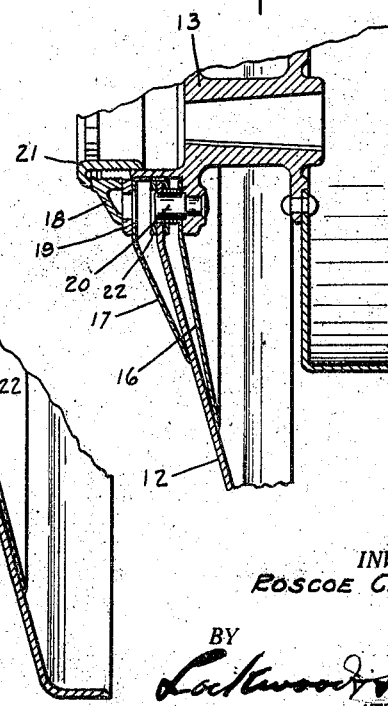
INVENTOR.
ROSCOE C. HOFFMAN
BY
*Lockwood & Lockwood*
ATTORNEYS

UNITED STATES PATENT OFFICE.

ROSCOE C. HOFFMAN, OF ARGOS, INDIANA.

DISK WHEEL.

1,353,161.

Specification of Letters Patent.  Patented Sept. 21, 1920.

Application filed August 30, 1919. Serial No. 320,773.

*To all whom it may concern:*

Be it known that I, ROSCOE C. HOFFMAN, a citizen of the United States, and a resident of Argos, county of Marshall, and State of Indiana, have invented a certain new and useful Disk Wheel; and I do hereby declare that the following is a full, clear, and exact description thereof, reference being had to the accompanying drawings, in which like numerals refer to like parts.

This invention relates to a disk type of wheel especially adapted for use in connection with motor vehicles, and especially that type of vehicle employing a demountable tire, and being demountable from the hub thereof.

The main feature of this invention is to so construct a disk wheel that the load will be carried thereby in both compression and suspension, and the road shocks taken indirectly, the shock being transmitted to the axle of the vehicle and distributed around the rim, by the spring tension inherent in the construction of the wheel.

The construction of this disk type of wheel is such that it will combine yielding qualities with strength and afford maximum resiliency.

This is accomplished by dishing the disk outwardly and forming it of an even thickness of sheet metal, which will be yieldingly strengthened and braced by means of auxiliary disks of less diameter mounted on either side of the supporting disk in position to engage and brace against the supporting disk between its center and periphery in the same manner as the leaves of a spring.

A further advantage of this construction lies in its ability to be formed by a simple stamping process because of the even thickness of the sheet metal, whereas in most other constructions it is necessary to taper the thickness thereof from the center outwardly to the periphery.

A fuller advantage of the construction set out herein, is the means for preventing any vibration of the supporting disks, the vibration being overcome by the yielding pressure exerted on each side thereof by the bracing auxiliary disks.

Referring to the drawings, which are made a part of this application, Figure 1 is a side elevation of a disk wheel. Fig. 2 is a central vertical cross section through the lower portion thereof. Fig. 3 shows a section of the assembly of disks. Fig. 4 is a modified form showing the disks in position to be assembled together on the hub.

In the drawings there is shown a vehicle wheel having a tire 10 mounted on the wheel rim 11, said rim being mounted on a supporting disk 12 which is secured to the hub 13. The wheel rim 11 may be of any standard construction such as are now used upon wire wheels, and is riveted to the lateral and inwardly extending peripheral flange 14 of the disk 12, the peripheral edge of said disk being in addition welded thereto to prevent any side play. The disk 12 is dished outwardly so as to bulge out at its center, as shown in Fig. 2, so as to permit of a certain amount of spring-like resiliency, whereby a shock received by the wheel will not be transmitted directly or radially to the hub, but will be taken up in the lateral yielding spring tension of the disk and distributed about the periphery thereof.

In order that the supporting disk may be made of equal thickness throughout its entirety, and to additionally strengthen the disk, and at the same time permit it to retain its resiliency, an inner reinforcing spring disk 16 is mounted adjacent the inner surface of the supporting disk so as to conform substantially to its curvature and engage said surface by its periphery exerting a slight outward pressure and yieldingly bracing the supporting disk against both side and radial thrusts. Mounted adjacent the outer surface of said supporting disk there is a bracing disk 17 of less diameter than the bracing disk 16, conforming to the outer curvature of said supporting disk and formed so that its outer periphery will bear and exert an inward force against the outer surface of said disk for yieldingly bracing said disk against an outward side thrust, said bracing disks 16 and 17 having the same relative action to the disk as the leaves of the spring have to the main leaf. Fig. 4 shows the three disks in position before they are tightened up at their center in complete assembly, and illustrates the fact that the disk 17 has a greater dish than the disk 12, while the disk 16 has a lesser dish, whereby as soon as their central portions are secured together as shown in Figs. 2 and 3 their peripheries will exert oppositely directed forces against the surface of the supporting disk 12 sufficient to counter-act each other, and cause said bracing disks 16 and 17 to immediately take up any lateral stress or strain on the disk 12.

The three disks are secured together by riveting, and spacing them apart by the rings 22, so that assembled, they form a single unit for mounting on the hub as shown in Fig. 3. The assembled disks forming the wheel are removably secured on the hub 13 by the nut 18 which secures their central portion against the flanged portion of the hubs 13, the collar 19 and pins 20 retaining said disks in their proper relation to the hub. The nut 18 is further locked upon the hub by the locking nut 21 which screws into the inner threaded portion of the hub 13.

The invention claimed is:

1. A disk type wheel for vehicles including a hub, a supporting disk secured on said hub composed of a single sheet of metal, a tire rim secured to the periphery of said disk, and yielding bracing means freely mounted adjacent each side of said disk for resiliently bracing said disk against any stress or strain.

2. A disk type wheel for vehicles including a hub, a supporting disk secured on said hub, and a disk mounted adjacent said supporting disk on each side thereof and in free engagement therewith for yieldingly reinforcing said supporting disk against lateral or radial stress.

3. A disk type wheel for vehicles including a hub, a supporting disk secured on said hub, and a bracing disk mounted on each side of and adjacent said supporting disk having its central portion spaced therefrom and its periphery in free engagement therewith for yieldingly reinforcing said disk against radial and lateral stress.

4. A disk type wheel for vehicles including a hub, a supporting disk secured on said hub, said disk being dished, a tire rim mounted on the periphery of said disk, a bracing disk mounted on each side of said supporting disk and substantially conforming thereto so as to engage and reinforce said disk against lateral or radial stress.

5. A disk type wheel for vehicles including a hub, a supporting disk secured on said hub, said disk being dished and of equal thickness throughout, an inner reinforcing disk of lesser diameter and substantially conforming to said supporting disk having its central portion spaced therefrom and its peripheral edge in engagement therewith, a reinforcing disk mounted on the outer side of said supporting disk and of less diameter than said inner disk, and having its inner portion spaced from and its peripheral edge in engagement with said supporting disk whereby said adjacent disks will yieldingly reinforce said supporting disk against radial and lateral stress.

6. A disk type wheel for vehicles including a hub, a supporting disk secured on said hub, said supporting disk being dished outwardly, a reinforcing disk mounted on each side of said supporting disk for reinforcing it against radial and lateral stress, an inwardly turned flanged portion about the periphery of said supporting disk, and a tire rim adapted to surround said flange and be rigidly secured thereon.

7. A disk type wheel for vehicles including a hub, a supporting disk secured on said hub, and resilient means for embracing said supporting disk freely so as to counteract any lateral stress and overcome any vibrations set up in said supporting disk.

8. A disk type wheel for vehicles including a hub, a supporting disk secured on said hub, and resilient disks so dished as to be set up against opposite sides of said supporting disk under oppositely directed tension whereby said supporting disk will be firmly embraced and supported against lateral strains.

In witness whereof, I have hereunto affixed my signature.

ROSCOE C. HOFFMAN.